Aug. 10, 1937.  E. MÖLLER  2,089,756
DEVICE FOR INCREASING THE SPEED OF TRANSMISSION OF PRESSURE
ALTERATION IMPULSES IN PNEUMATIC BRAKE PIPES
Filed June 12, 1935
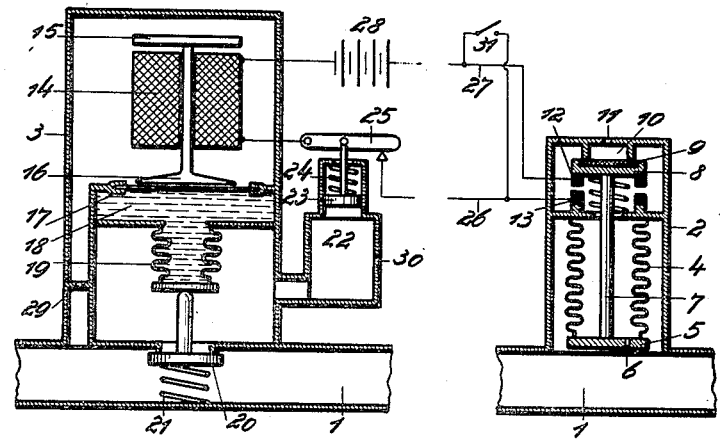
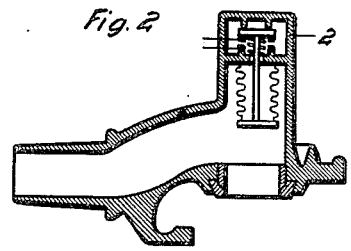
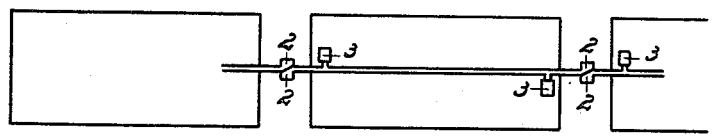
Inventor
Ernst Möller
Cushman, Darby & Cushman
Attorneys Patented Aug. 10, 1937

2,089,756

UNITED STATES PATENT OFFICE 2,089,756

DEVICE FOR INCREASING THE SPEED OF TRANSMISSION OF PRESSURE-ALTERATION IMPULSES IN PNEUMATIC BRAKE PIPES

Ernst Möller, Karlshorst, Berlin, Germany, assignor to Knorr-Bremse Aktiengesellschaft Lichtenberg, Berlin, Germany, a joint-stock company of Germany Application June 12, 1935, Serial No. 26,312
In Germany June 14, 1934

10 Claims. (Cl. 303—82)

Devices for increasing the speed of transmission of a pressure-alteration impulse in the compressed air pipe of a railway train are known, in which the transmission of the impulse from one end of the vehicle to the other takes place by means of mechanical transmission means for the purpose of producing in each case in the brake pipe a new independent impulse which is initiated at a point in advance of the original impulse to the extent of the length of the vehicle.

It has also been proposed to transmit the impulses by electric means from one end of the vehicle to the other and to make use, in this operation, of the source of electric energy (lighting battery) carried in the vehicle, this being effected by reason of the fact that the pressure-alteration wave reaching the vehicle closes a switch situated at the end of the vehicle first reached by the said wave, whereby an electromagnet situated at the other end of the vehicle is excited and opens a brake pipe outlet valve, thereby producing a new independent pressure-alteration impulse.

However, the practical application of the constructional form of the device with electric transmission is impeded by difficulties, which do not occur when the transmission is purely mechanical. The latter is therefore always given preference when the conditions of space permit of its arrangement, in particular the installation of the straightest possible draw rod, which extends under the vehicle from one end thereof to the valve arrangement situated at the other end of the vehicle.

In the case of vehicles in which the space situated under the body of the vehicle is already taken up to a considerable extent by motors, compressors, relay installations, compressed air brake installations and the like, the installing of the mechanical transmission means is not feasible; for these vehicles, electric transmission is required, for which the current cables need not be rectilinearlly arranged.

As has already been stated, the use of electric transmission is attended by difficulties insofar as the time required for building up the magnetic field of force of the electromagnet of the brake pipe outlet valve from the switching on of the current until the opening of the valve is considerably greater than the corresponding time when using mechanical transmission.

The formation of the magnetic field of force takes place by the exciting current in the coil rapidly increasing at the moment of the switching on, but is then delayed in a continuously increasing manner and finally creeps up to its maximum value.

Therefore, in order to obtain a magnetic field of force of sufficient strength for operating the brake pipe outlet valve within the necessary short period, it would be necessary to considerably over-dimension the electromagnet, as a magnetic field of half the maximum value that can be reached is developed in one quarter of the time which is required for building up the maximum magnetic field.

A further fact which has hitherto stood in the way of the use of electric transmission for such devices resides in that in the interest of sufficient extraction of air from the brake pipe when producing a new impulse, the outlet aperture freed by the brake pipe outlet valve must not be much smaller than the cross-section of the pipe; in the case of a pipe of 1″ in internal diameter, this means a lift of the opening valve of about 8 m/m. However, as with increasing distance of the armature of the electromagnet from the coil the force of the magnet greatly diminishes, there resides therein a further reason for over-dimensioning the magnet and using strong exciting current. However, having regard to the low output capacity of the lighting battery carried on railway vehicles it is not possible to meet this requirement.

However, even if the difficulties referred to did not exist, the necessity of reliably switching on and off the necessary high current intensities would give rise to difficulties, because the switching times must be short and in view of the danger of arcing the switching operations must be carried out at great speed; the low voltage (24 volts) necessitates great pressure between the contact surfaces.

Now, the object of the invention is to overcome the aforesaid difficulties when using electric transmission, and the requirements which must be essentially met are again briefly set forth below:

(1) The brake pipe outlet valve must be as large as possible, but must at the same time be as light and as free from load as possible.

(2) The lift of this valve must be sufficiently great, while the lift of the armature of the electromagnet bringing about this lift must be as small as possible.

(3) The magnet must be as greatly overdimensioned as possible with respect to the output required from it.

(4) The switch situated in the exciting circuit for the magnet must have as small a switching path as possible and at the same time have great contact surfaces.

(5) The switching movement must be carried out as quickly as possible.

(6) The contact surfaces must lie against one another with great pressure.

In order that the said invention may be clearly understood and readily carried into effect, the same will now be described more fully with reference to the accompanying drawing, in which:—

Figure 1 is a diagrammatic illustration of the device according to the invention.

Figure 2 shows a detail more fully described below, and

Figure 3 shows the arrangement of the device on several vehicles coupled together.

To the brake pipe 1 there is connected at one end of the vehicle the compressed air switch 2, and at the other end of the vehicle the brake pipe outlet valve with the electromagnet 3.

Both a switch 2 and a magnet 3 must naturally be provided at each end of the vehicle because a train which has traversed a section in one direction of travel travels in the opposite direction on the return journey, and the locomotive from which the pressure-alteration impulses emanates in the pneumatic brake pipe, lies in the outward journey at one end of the train, and in the return journey at the opposite end of the train; whatever its position with respect to the train of coaches may be, the pressure-alteration impulse emanating from it in the pneumatic brake pipe must always encounter the switch 2 when reaching the end of a coach or wagon facing towards the locomotive, which switch connects the magnet 3 lying at the other end to the source of current.

Switch 2 and magnet 3 are therefore provided at each end of the vehicle and act, to a certain extent, crosswise, that is, the switch 2 situated at one end of the vehicle acts on the magnet 3 situated at the other end of the vehicle.

The compressed air switch 2 has a part 4, constructed, for example, as bellows, or as a corrugated tube or the like and having a piston bottom 5, a nozzle 6 situated therein and a plunger 7, with which it acts on a valve plate 8 which, with a leather washer, rubber washer or the like 9, closes a space 10 enclosed by an edge in the form of a valve seat. The space 10 is in communication with the atmosphere through a boring 11 situated in the wall of the housing.

The valve plate 8 has on its lower surface a contact ring 12, opposite which there lies a similar contact ring 13 secured to the housing of the compressed air switching device. The housing is so connected to the brake pipe 1 that the corrugated body 4 projects into a space filled with pipe air.

The brake pipe outlet valve situated at the other end of the vehicle consists of a similar housing 3 enclosing this valve and the corresponding electromagnet. The valve body 20 loaded by a closing spring 21 closes the communication between the brake pipe 1 and a chamber 22, which communicates with the atmosphere through a nozzle 30.

In the upper part of the housing 3 is situated the electromagnet 14, the armature 15 of which acts by means of a plate 16 on a diaphragm 17 inwardly shutting off a space 18 filled with liquid. The space 18 extends downwardly into a corrugated body 19, the bottom of which is in contact with the spindle of the valve 20. The plate 17 and the bottom of the corrugated body 19 constitutes a transmission device, which converts the small movement of the armature 15 of the electromagnet 14 according to its surface ratio into the sufficient opening movement of the valve 20.

The space in which the electromagnet 14 is situated is in communication with the brake pipe 1 through a nozzle 29. The diaphragm 17 is therefore loaded on the upper side by the brake pipe pressure; the size of the corrugated body 19 and the pressure-loaded part of the valve 20 are such that the pipe pressure exerted on the valve and, in some cases, a part of the tension of the closing spring 21 are balanced by the pipe pressure acting on the diaphragm 17.

The coil of the electromagnet 14 is, on the one hand, in communication with the battery 28 through the line 27, which in its turn is connected with the contact ring 12; on the other hand, the magnet coil is connected with the contact ring 13 by means of the line 26. In the last-mentioned connection a switch 25 is placed which is controlled by the piston 23 loaded in the sense of the closing of the switch 25 by the spring 24, the said piston being situated in a cylindrical projection of the chamber 22 and being provided for separating the switch 2 as quickly as possible from the battery after coming into operation, in order in this way to protect the contacts 12 and 13.

The hereinbefore described device also permits of a simplification of the emergency braking arrangement. From each of the two lines 26 and 27 a branch line extends into the interior of each compartment of the vehicle and between the ends of these lines a switch 31 sealed in the open position is arranged.

The switch 31 is arranged inside the space of the vehicle provided for the passengers, and here acts in the same way as the known emergency brake handle. If, therefore, in the case of danger to a passenger or to the train, the switch 31 is closed, the current flows from the source of current 28 through the closed switch 31, further through the pipe 26, the closed switch 25 and through the winding or the coil of the electromagnet 14 back to the source of current (battery) 28; the magnet 14 thus receives exciting current and the brake pipe outlet valve 20 is opened. The switch 31 therefore embodies the emergency brake arrangement open to operation by the passengers.

When the brake pipe 1 is filled with compressed air, the brake pipe outlet valve 20 is closed by its closing spring 21. The space above the diaphragm 17 is filled through the nozzle 29 with compressed air, the pressure gradually increasing in this space being transmitted through the diaphragm 17 and the liquid situated beneath it and through the bellows 19 to the spindle of the valve 20 and gradually freeing this valve from load. As the nozzle 29 delays the filling of the space situated above the diaphragm 17, the valve 20 is first forced under excess pressure on to its seat; only when the pressure in the said space has reached the magnitude of the pipe pressure is, the valve 20 and a part of the spring 21 freed from load, whereby the condition mentioned above under (1) is fulfilled. The freeing of the valve 20 from load and the small lift, which the electromagnet has to carry out owing to the interposition of the liquid transmission, in order to open the valve 20, permit of a considerable overdimensioning of the magnet with respect to the output required from it, whereby the conditions referred to under (2) and (3) are fulfilled. As the valve 20 is closed and the space 22 is relieved of air through the nozzle 30, the piston 23 holds the switch 25 closed under the influence of its spring 24.

The bellows 4 in the switching device 2 is compressed when the brake pipe 1 is filled, whereby the valve 8 is firmly pressed on to the seat with the packing disc 9, and the contact ring switch 12—13 is opened. The inner space of the bellows 4 is filled with compressed air through the nozzle 6 until pressure equilibrium is established; the spring surrounding the plunger 7 extends the bellows without completely stretching them. The force cup-like action of the space 10 freed of air holds the valve 8, 9, securely closed.

It is thereby rendered possible to fulfill the requirement mentioned above under (4); at the same time, by the force cup-like action the requirement mentioned under (5) is fulfilled, as the force cup first holds the valve fast when the contact ring switch is closed, and a rapid striking together of the contact rings 12 and 13 cannot take place until after the force cup action has been overcome and, consequently, the resistance to movement has disappeared.

As the device illustrated in the drawing and consisting of the compressed air switch 2 and the electro-valve 3 is provided in duplicate on the vehicle, that is, one switch 2, at each end of the vehicle of which the associated electro-valve 3 is situated at the opposite end of the vehicle, one of the compressed air switches 2 is first affected by the pressure-reducing wave upon braking, irrespective of from which side this wave approaches the vehicle. The bellows or the corrugated tube 4 is thereby extended, the suction cup 9 is forced away from the space 10 and the switching ring 12 is forced on to the switching ring 13 with great force and great speed. The circuit extending from the battery 28 through the switching rings 12 and 13, the line 26 and the switch 25 to the magnet coil 14 is thus closed. The armature 15 is attracted, the liquid in the space 18 comes under the additional pressure of the magnet, the corrugated tube 19 opens the valve 20 and the compressed air flows rapidly into the chamber 22; a new pressure-reducing wave leading to the extent of the length of the carriage with respect to the original pressure-reducing wave is thus generated in the brake pipe 1. The excess pressure very rapidly forming in the chamber 22 opens the switch 25 with great speed by means of the piston 23. Excess stressing of the battery 28 is thereby prevented and the contacts 12 and 13 are protected from burning, as the opening of the contacts 12 and 13 after the pressure equalization has been effected by the nozzle 6 under the influence of the spring situated in the corrugated tube 4 only takes place very gradually.

By the interruption of the exciting current of the electromagnet 14, the space 18 loses its additional pressure, the valve 20 is closed under the action of the spring 21, the chamber 22 is freed of air through the nozzle 30 and after the pressure in the chamber 22 has thus fallen below the value corresponding to the tension of the spring 24, the switch 25 is again closed, and the device is again ready for operation.

By the hereinbefore described arrangement, the speed of penetration is considerably increased beyond the value which can be obtained with mechanical transmission, while the devices are otherwise arranged in the same manner.

The above-described electric transmission, however, also permits of extending the accelerating action of the device to the hose coupling.

The compressed air switch 2 may be arranged in the manner shown in Figure 2 in the correspondingly constructed coupling head of the hose coupling, so that the brake pipe outlet valve situated at the other end of the vehicle already comes into operation when the pressure-reducing wave in the brake pipe reaches the coupling head of the hose coupling.

The particular value of this arrangement, to which it might be objected that better results could be obtained if a continuous electric line were used, may be seen from the fact that the latter step could only be carried out by international arrangement, as vehicles not equipped with this line cannot be placed at any point of a train with a continuous control line.

The construction in the above-proposed form does not require such an international regulation, as vehicles which are not equipped with the device according to the application are immediately passed over by the accelerated pressure-reducing wave.

What I claim and desire to secure by Letters Patent of the United States is:—

1. The combination with a pneumatic brake pipe for a railway train, of an outlet valve, an electromagnet with a movable armature to operate said valve, and a transmission device between said armature and said valve, said transmission device comprising a liquid-containing vessel, a piston of relatively large area and short stroke operatively connected with the armature to act on said vessel, and a piston of relatively small area and longer stroke operable by the pressure of the liquid in said vessel to effect movement of said valve.

2. The combination with a pneumatic brake pipe for a railway train, of an outlet valve, an electromagnet with a movable armature to operate said valve, and a transmission device between said armature and said valve, said transmission device comprising a fluid-containing vessel, a piston of relatively large area and short stroke operatively connected with the armature to act on said vessel, and having a relatively narrow collapsible extension, a piston of relatively small area at the extremity of said extension engaging the spindle of said outlet valve, said last named piston being operable by fluid pressure in said vessel to effect a rapid opening of said valve.

3. The combination with a pneumatic brake pipe for a railway train, of an outlet valve having a spindle, a spring tending to close said valve, an electromagnet with a movable armature, a liquid-containing vessel, a piston connected with said armature to act on said vessel, and a smaller piston operable by liquid pressure in said vessel engaging said spindle to open said valve against the resistance of said spring upon actuation of said armature.

4. The combination with a pneumatic brake pipe for a railway train, of a spring-loaded outlet valve, an electromagnet with a movable armature to open said valve, a fluid-containing vessel interposed between said armature and said valve, a flexible diaphragm on said vessel, means to admit brake pipe pressure to act on said diaphragm to counteract the pressure of the spring on said valve, whereby said valve is freed from load and can be rapidly opened by the action of said armature.

5. The combination with a pneumatic brake pipe for a railway train, of an outlet valve, an electromagnet to operate said valve, and an electric switch responsive to variations in pressure in said brake pipe to open and close the circuit of said electromagnet, one member of said switch being provided with suction means to hold it open until the occurrence of a sufficient reduction in pressure in the brake pipe enables said switch member to close with great speed on its associated switch member to close the circuit.

6. The combination with a pneumatic brake pipe for a railway train, of an outlet valve, an electromagnet to operate said valve, and an electric switch responsive to variations in pressure in said brake pipe to open and close the circuit of said electromagnet, a housing for said switch having a plurality of compartments, said switch comprising a relatively fixed ring and a movable ring, a spring-loaded disc connected with the movable ring and normally closing a compartment of the housing under atmospheric pressure, said disc being normally exposed to higher pressure from the brake pipe, and a piston connected to said disc and responsive to variations in said brake pipe pressure, whereby on a sufficient reduction of brake pipe pressure said piston detaches said disc from said compartment and rapidly closes the switch.

7. The combination with a pneumatic brake pipe for a railway train, of an outlet valve, an electromagnet to operate said valve, means responsive to variations in the pressure in said brake pipe to open and close the circuit of said electromagnet, an interrupting switch interposed in said circuit adjacent said outlet valve, and means dependent on the opening of said outlet valve to actuate said interrupting switch to open the circuit immediately after such opening has been effected.

8. The combination with a pneumatic brake pipe for a railway train, of an outlet valve, an electromagnet to operate said valve, means responsive to variations in the pressure in said brake pipe to open and close the circuit of said electromagnet, an interrupting switch interposed in said circuit adjacent said outlet valve, a chamber opened to brake pipe pressure upon the opening of said outlet valve, and exhausting to atmosphere, a piston reciprocable in said chamber and operatively connected with said interrupting switch to open said switch under the influence of brake pipe pressure, and a spring impelling said piston in the direction to close said switch as the said pressure is reduced.

9. The combination with a pneumatic brake pipe for a railway train, of an outlet valve, a spring tending to close said valve, an electromagnet with a movable armature to open said valve, a chamber, a transmission device interposed between said armature and said valve and exposed to the pressure in said chamber, and means to admit pressure medium from said brake pipe to said chamber to bear on said transmission device to counteract the pressure of the spring on said valve.

10. The combination with a pneumatic brake pipe for a railway train, of an outlet valve, a spring tending to close said valve, an electromagnet with a movable armature to open said valve, a chamber, a transmission device interposed between said armature and said valve and exposed to the pressure in said chamber, a partition between said brake pipe and said chamber, said partition having a restricted aperture to admit pressure medium slowly from said brake pipe to said chamber to bear on said transmission device to counteract the pressure of the spring on said valve and thereby to relieve said valve from load with a delayed action during the filling of the brake pipe.

ERNST MÖLLER.